United States Patent [19]

Longpré et al.

[11] Patent Number: 5,398,979
[45] Date of Patent: Mar. 21, 1995

[54] SEAL FOR MANHOLES AND DRAINS

[76] Inventors: Pierre Longpré, 4974 Chemin Ste-Catherin, RR #1; Joël Duval, 5915, rue des Léas, both of Rock Forest, Quebec, Canada, J1N 3B8

[21] Appl. No.: 154,444

[22] Filed: Nov. 19, 1993

[30] Foreign Application Priority Data

Jun. 22, 1993 [CA] Canada ............................ 2098938

[51] Int. Cl.6 .............................................. F16L 49/00
[52] U.S. Cl. ..................... 285/230; 285/291; 285/330; 285/910
[58] Field of Search ............... 285/230, 288, 291, 330, 285/910

[56] References Cited

U.S. PATENT DOCUMENTS

| | | | |
|---|---|---|---|
| 3,380,763 | 4/1968 | Schmunk | 285/230 X |
| 3,809,412 | 5/1974 | Glover | 285/230 X |
| 4,076,283 | 2/1978 | Harrison | |
| 4,116,474 | 9/1978 | Wolf | |
| 4,325,572 | 4/1982 | Arntyr et al. | |
| 4,394,025 | 7/1983 | Anderson | 285/230 X |
| 4,443,282 | 4/1984 | Stachitas | |
| 4,703,940 | 11/1987 | Dana | |
| 4,711,473 | 12/1987 | Glover | 285/230 X |
| 4,961,599 | 10/1990 | Delery et al. | 285/230 |
| 5,127,680 | 7/1992 | Takei | 285/291 X |

FOREIGN PATENT DOCUMENTS

| | | | |
|---|---|---|---|
| 57802 | 1/1975 | Australia | 285/230 |
| 3114736 | 10/1982 | Germany | 285/230 |
| 1143668 | 2/1969 | United Kingdom | 285/230 |
| 985536 | 12/1982 | U.S.S.R. | 285/230 |
| 985537 | 12/1982 | U.S.S.R. | 285/230 |
| 985539 | 12/1982 | U.S.S.R. | 285/230 |

Primary Examiner—Dave W. Arola
Attorney, Agent, or Firm—Paul Marcoux

[57] ABSTRACT

The sections of concrete tubes or rings are connected end to end by means of a joint, and, in order to prevent aggregates and other undesirable materials to penetrate into the joint when a space is formed in the latter following climate modifications or other disturbances, there is disposed at the level of the joint, a ring of flexible material, which includes a flange made to remain pressed against the joint and to cover the latter permanently even if a space is produced in the joint. This ring is preferably fixed at one of the sections of tube and this ring may even be made of two interconnecting members.

12 Claims, 2 Drawing Sheets

SEAL FOR MANHOLES AND DRAINS

BACKGROUND OF INVENTION a) Field of the invention

The present invention relates to a joint for manholes and drains. More specifically, the invention concerns a sealing device for tube sections and concrete rings connected end to end by means of a joint and adapted to prevent aggregates and other noxious and undesirable materials to be introduced into the joints when a space is produced in the latter following climate modifications or other disturbances, such as during thawing and unthawing periods.

b) Description of Prior Art

It is known that the assembling of manhole tubes and rings, and drains imply the end to end connection of a plurality of sections of which the number varies depending on the depth which is intended to be reached. Generally, the different sections of tubes and rings are usually connected by means of lap joint connections. Now, in theory, even during a period of thawing and unthawing, it is essential that the different sections of tubes and rings always come back to their initial position after any kind of movement of the ground, if it is intended that the frame and the grid which covers them always remain in the same position with respect to the surface of the ground. In practice, each movement of the ground nearly always produces a space in the joint between the sections of tubes and rings, thus giving free access to the aggregates and other undesirable materials. In is obvious that following an accumulation of some importance in the joint, the frame and the grid will never return to their original position. In order to prevent the aggregates and other undesirable materials from being introduced into the joint, sheets of polyethyl or paper, with which the joint is covered, are often used. It is certain that the important stresses which are involved do not prevent these sheets from being torn thus rendering this precaution completely useless.

U.S. Pat. No. 4,076,283 describes an intricate system of expansion joint for drain pipes including a flexible band which is fixed on a pipe and is curved unto itself, to be fixed on the adjacent pipe.

U.S. Pat. No. 4,116,474 describes a joint system including a sealing ring having a plurality of characteristics, in which an insert device is introduced.

U.S. Pat. No. 4,325,572 describes a intricate arrangement having a double curve.

U.S. Pat. No. 4,443,282 describes a pipe coupling including a sealing ring having a plurality of characteristics, in which an insertion socket is introduced.

U.S. Pat. No. 4,325,572 describes a complex system utilizing a sealing cuff folded into an S configuration.

U.S. Pat. No. 4,443,282 describes a ring joint utilizing a sealing material within and under the ring.

Finally, U.S. Pat. No. 4,703,940 describes the use of a compression ring in combination with a sealing ring.

It will therefore be seen that attempts have been made to solve the problem discussed above. However, these attempts are all more complicated and expensive than the others without ensuring that the questions has been resolved..

It is therefore all object of the present invention to provide a solution to the joints between sections of tubes and rings of manholes and drains, which is easy, rapid and efficient.

SUMMARY OF INVENTION

The invention concerns a sealing device for concrete pipe sections and rings connected end to end by means of a joint., effective to prevent aggregates and other undesirable materials from being introduced into the joint when a space is formed in the latter following climate modifications or other disturbances. The device comprises a first ring of flexible material which is adapted to be fixed at one end of a first tube section where the joint will be formed, when pouring concrete. The first ring of flexible material includes a flange formed to remain pressed against the joint and permanently covering the latter even if a space is produced in the joint.

According to a preferred embodiment of the invention, the first ring of flexible material is fixed at the end of the first section of tube. On the other hand, it is preferred that the flange extends past the joint and be manufactured to remain pressed against a second section of tube or concrete ring even if a space happens to be produced inside the joint.

According to another embodiment of the invention, the first ring of flexible material includes a fixing member, intended to be bound within the concrete to fix the first ring of flexible material to the first section.

According to another embodiment of the invention, the first ring of flexible material includes a first portion, provided with the fixing member, intended to be placed in a first external tapering cut out formed at the end of the first section when pouring concrete, and a second portion intended to be placed in a second external tapering cut out provided at end of the second tube section which is adjacent to said end of the first section. This second portion has a thickness which is preferably decreasing from the joint to the end thereof.

Although any form of fixing member might be used as is well known to those skilled in the art, according to the invention, the preferred fixing member is in the form of a curved finger which is unitary with the fixing member, or a concrete attachment button which is impregnated in the first ring portion.

According to another embodiment of the invention, the ring of flexible material is adapted to be fixed on a first edge of the first section of tube, when pouring concrete.

Preferably, the second section of concrete tube or ring includes a second edge intended to be placed adjacent the first edge. This second edge then includes an external lap forming an internal seat, and a tapering cut out. On the other hand, the first ring of flexible material then includes an internal lap forming an external seat, the latter extending into the flange, which is placed in the tapering cut out provided in the second section of concrete tube or ring. The joint is formed when the first and second sections are placed end to end, the internal lap is inserted into the internal seat, and the external lap is inserted into the external seat. If a space happens to be formed in the joint, in spite of this, the flange remains against the second section at the level of the tapering cut out thus preventing aggregates and other undesirable materials from penetrating into the joint.

According to another embodiment of the invention, the edge of the second section consists of a second ring of flexible material which is added at a corresponding end of the second section when pouring concrete, this second ring, including the external lap, the internal seat and the tapering cut out.

Preferably, the second ring is made of a flexible material, for example the first and second ring of flexible material are manufactured from shredded and molded tire waste, or any other material of the same type.

BRIEF DESCRIPTION OF THE DRAWINGS

The invention will now be illustrated by means of the annexed drawings given by way of illustration but without limitation. In the drawings which illustrate the invention.

DESCRIPTION OF PREFERRED EMBODIMENTS

Figure 1:
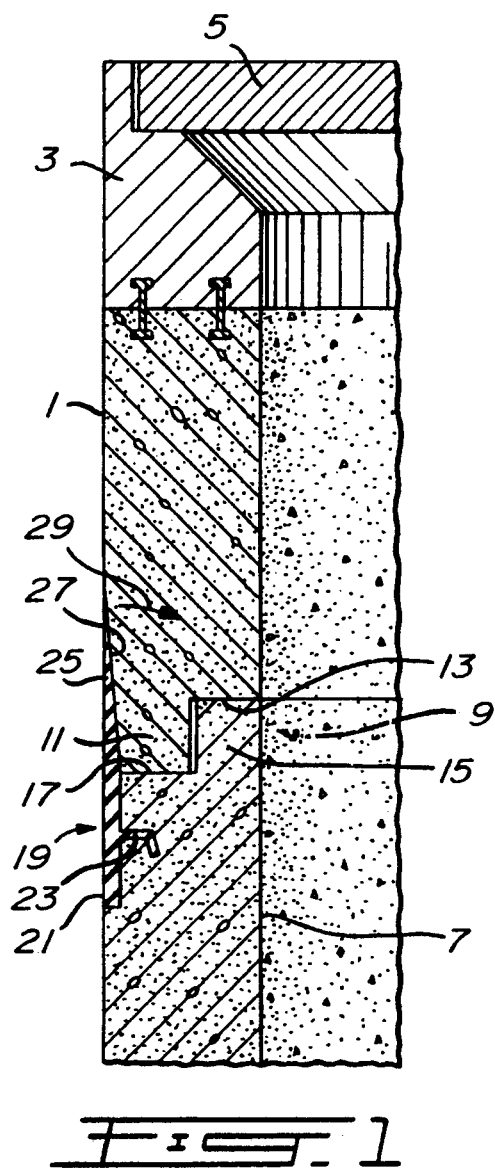
FIG. 1 is a vertical cross-section view of a sealing device according to the present invention.

With reference to the drawings, more specifically FIG. 1, there is illustrated one of the three embodiments mentioned above. More specifically, the upper part only of a drain pipe is shown, including first concrete pipe section 1 on which a frame 3, in which there is disposed a grid 5, is mounted in known manner. The frame and the grid are well known per se and, obviously, form no part of the invention. There is also illustrated, in part, a second tube section 7, connected to section 1 by means of a joint 9 which will now be described.

It is obvious that any form of joint well known in the art could be used. However, the more interesting shape was selected; more specifically, a lap joint was used. Thus, the lower edge of the tube section 1 ends by an external lap 11 and an internal seat 13. With respect to tube section 7, its upper edge consists of an internal lap 15 and an external seat 17. In this manner, the external lap 11 is inserted in seat 17 and the internal lap 15 penetrates into internal seat 13, so as to constitute joint 9 by lap-joint assembly. It is obvious that without other protection, any relative movement of the two tube sections 1 and 7 will enable the introduction of aggregates and other undesirable materials into the joint 9 without enabling these materials to exit therefrom to free the joint. These undesirable materials in the joint will cause the frame and its grid, 3 and 5, to move with respect to the ground which surrounds them, with all the disadvantages that this implies.

In order to prevent these external materials from penetrating into the joint, even when there are relative movements of tube sections 1 and 7, there is provided a ring 19 at the level of the joint 9. For this purpose, this ring 19 is made as a single member by molding shredded tire wastes or other materials of this type and it includes a portion 21 of uniform thickness which extends from its lower end to the level of the joint 9. In addition, there is a fixing member 23 in the form of a curved finger which projects from the portion 21 on the internal face of the latter. Finally, ring 19 consists of a second portion 25 which will be called here a flange, whose thickness decreases from the joint 9 to its other end. When tube sections 1 and 7 are manufactured, it should be understood that the operation is carried out by rotation molding. For this purpose, steps are taken to dispose ring 19 in a selected position in the mold after which concrete is added. During the drying step, the ring will become unitary with the tube section 7 by means of fixing member 23. With respect to tube section 1, the latter will also be manufactured by rotation molding and the mold which will be used will provide a cut out 27 capable of receiving portion 25 of ring 19 when joint 9 is closed by assembling tube sections 1 and 7.

When ring 19 is manufactured, steps are taken so that portions 25 continuously presses against the wall of tube section 1 at the level of cut out 27. For example, during its manufacture, it is recommended that portion 25 be made so as to swing somewhat towards the inside in the direction indicated by arrow 29, i.e. with a fold. Thus, if there is a relative movement of the two sections of tube 1 and 7, joint 9 will always be covered by the portion or flange 25, which will be pressed against joint 9, thus preventing all penetration of undesirable materials into the joint 9.

Figure 2B:
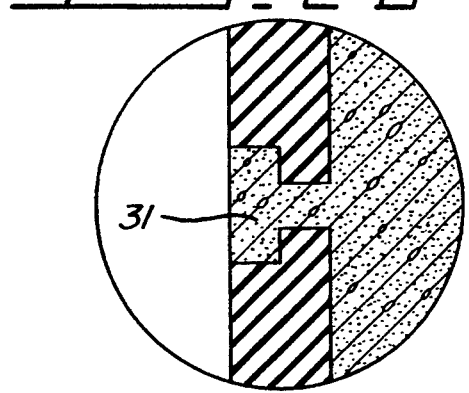
FIGS. 2A and 2B are a view similar to FIG. 1 of an alternative.
Figure 2A:
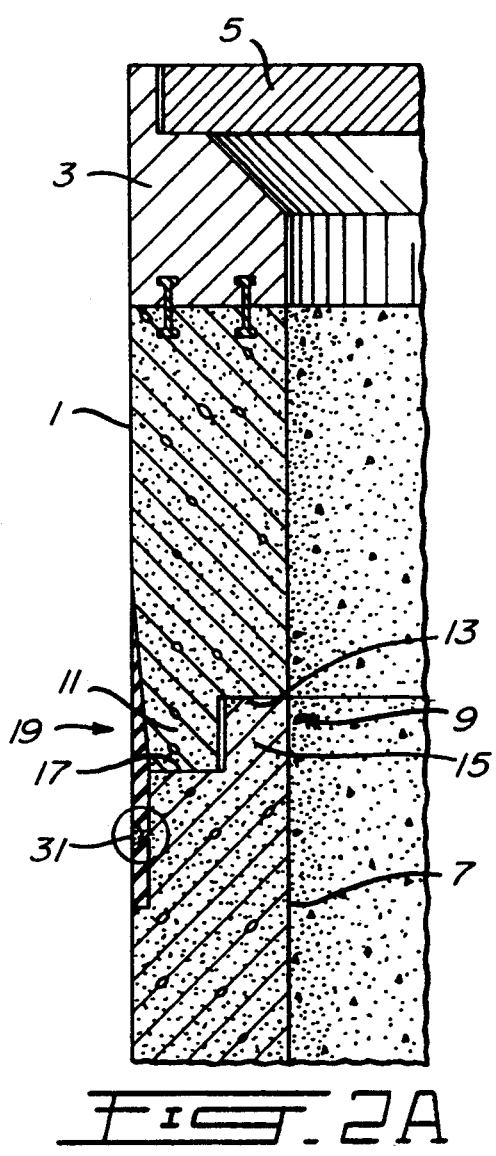

According an alternative, illustrated in FIG. 2, instead of providing an anchoring on the concrete tube section 7, consisting of a fixing member 23, there is provided a concrete anchor 31. To produce the latter, circular openings or T-shaped anchoring holes will be provided in portion 21 when molding the ring.

Figure 3:
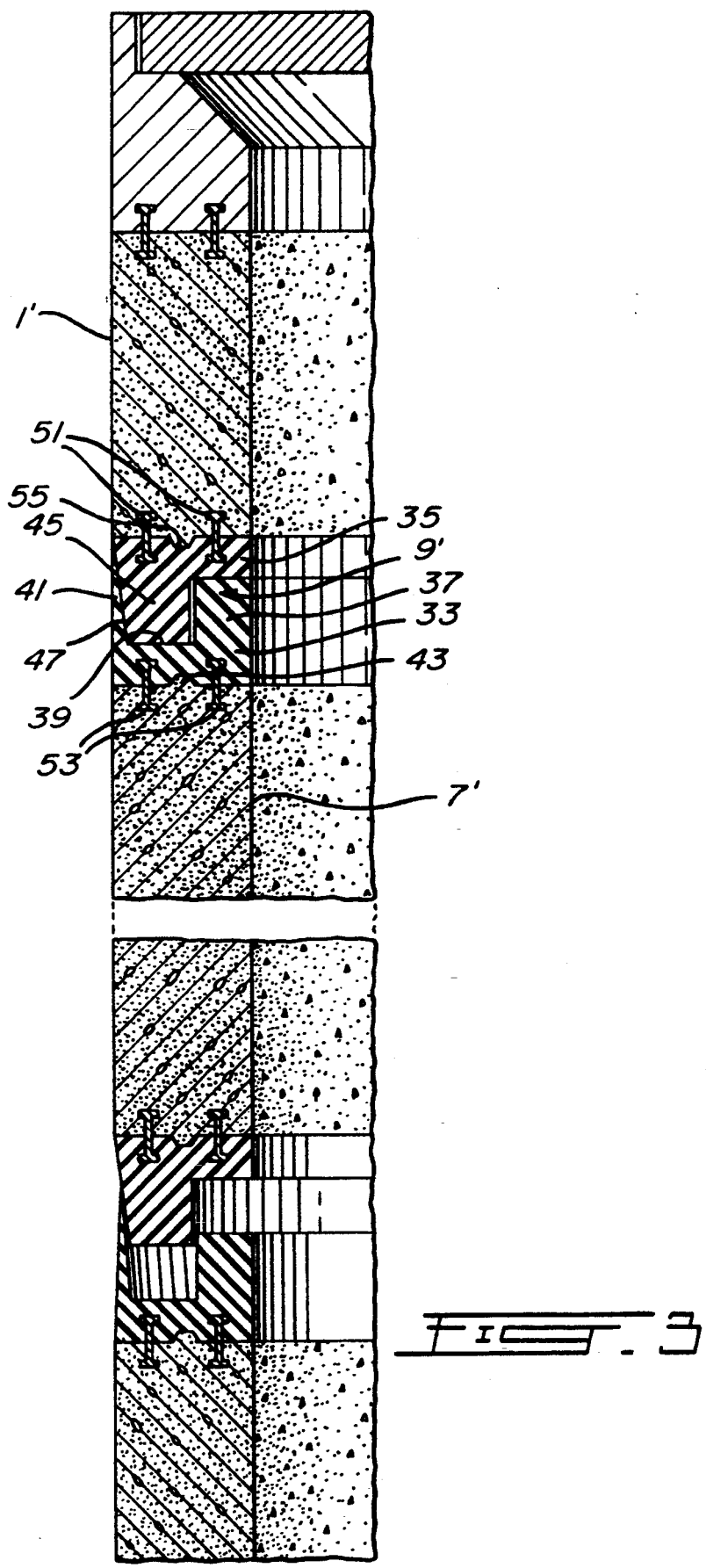
FIG. 3 is a vertical cross-section of another sealing device according to the present invention in which an opening of the joint is shown as an alternative.

According to the embodiment illustrated in FIG. 3, the ring of flexible material consists of two components 33 and 35 and tube section 1' and 7' includes edges which are different from those of tube sections 1 and 7.

Component 33 will first be described. The latter consists of an internal lap 37 and an external seat 39, which extends into a collar of decreasing cross-section 41 and which will also be provided with members 53 for attachment to concrete. The base of this component has a channel 43 which is used to prevent water from penetrating inside the duct between component 33 and tube sections 7'. Tube section 7' is made by rotation molding as this is the case for tube section 7. Previously, steps are taken to place component 33 in the upper part of the mold. Anchoring of component 33 to tube section 7' through hooks, 53 will taken place when pouring concrete.

Component 35 of ring 1' differs somewhat from component 33 of ring 7'. The latter includes an external lap 45 as well as an internal seat. The external face 47 of the lap is downwardly tapered so that when components 33 and 35 are connected together, flange or collar 41 remains pressed against the external face 47, even if a space is produced in joint 9' between components 33 and 35. It will therefore be recommended that when molding component 33 from shredded tire waste, or other materials of the same type, that flange 41 be interiorly offset, so as to remain firmly pressed against the external face 47.

Section 1' will also be manufactured by the rotation molding technique. However, it must be noted that component 35 incorporating imbricating hooks 51 is placed at the base of the mold when pouring concrete. As in the case of tube section 7', section 1' will also include a channel 55 whose purpose is also to provide a seal, as in the case of channel 43.

It is understood that components 33 and 35 of the ring are also made by molding shredded tire wastes or other materials of the same type as it is well known in the art.

We claim:

1. Sealing device for concrete pipe sections connected end to end by means of a joint, and effective to prevent aggregates and other undesirable materials from being introduced into the joint when a space is formed in the latter following climate modifications or other disturbances which spread said pipe sections from one another, said device comprising a first ring of flexible material, said first ring being formed with a securing portion and a flange portion, anchoring means associated with said securing portion engaged in concrete material of a first pipe section so as to fixedly mount said ring through said securing portion at one end of said first pipe section, said flange portion extending in continuation of said securing portion past said one end of said first pipe section so as to cover a mating end of a second pipe section connected to said first pipe section and said joint formed between said first pipe section and said second pipe section, means causing said flange to be resiliently urged against said mating end and said joint, said flange being long enough to permanently cover said joint even if said space is produced in said joint, thereby preventing said aggregates and other undesirable materials from penetrating into said space.

2. Device according to claim 1, wherein said anchoring means comprise a fixing member, which is bound within concrete when pouring concrete to fix said ring of flexible material to said first pipe section when said concrete hardens.

3. Device according to claim 1, wherein said securing portion is disposed in a first external cut out formed at the end of said first pipe section, and said flange portion is disposed in a second external tapering cut out provided at an end of said second pipe section adjacent said end of said pipe section.

4. Device according to claim 3, wherein the flange portion has a decreasing thickness from the joint to the outer end thereof.

5. Device according to claim 3 wherein the fixing member is shaped as a curved finger which is unitary with the securing portion.

6. Device according to claim 3, wherein the fixing member is shaped as a concrete attachment button which is impregnated in the first ring portion.

7. Device according to claim 1, wherein said ring of flexible material is fixedly mounted on a first edge of said first pipe section.

8. Device according to claim 7, wherein said second pipe section includes a second edge disposed adjacent the first edge, said second edge including an external lap defining an internal seat, and a tapering cut out, said first ring including an internal lap defining an external seat, said flange portion disposed in said tapering cut out provided in said second pipe section, said joint being formed when said first and said second pipe sections are placed end to end, the internal lap being inserted into the internal seat, and the external lap being inserted into the external seat, so that if a space is formed in the joint, the flange portion still remains pressed against said second pipe section at the level of the tapering cut out thereby preventing aggregates and other undesirable materials from penetrating into said joint.

9. Device according to claim 8, wherein the edge of said second pipe section consists of a second ring of flexible material disposed at a corresponding end of said second pipe section, said second ring including said external lap, said internal seat and said tapering cut out.

10. Device according to claim 9, wherein said second ring is made of flexible material.

11. Device according to claim 9, wherein the base of the two rings of flexible material includes a channel and hooks anchoring into concrete.

12. Device according to claim 1, wherein said first and said second ring are made of shredded and molded tire waste.

* * * * *